US011507539B2

(12) United States Patent
Hirsch et al.

(10) Patent No.: US 11,507,539 B2
(45) Date of Patent: Nov. 22, 2022

(54) APPARATUS AND METHOD FOR STORING RECEIVED DATA BLOCKS AS DEDUPLICATED DATA BLOCKS

(71) Applicant: Huawei Technologies Co., Ltd., Shenzhen (CN)

(72) Inventors: Michael Hirsch, Munich (DE); Yehonatan David, Munich (DE); Yair Toaff, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 250 days.

(21) Appl. No.: 16/800,743

(22) Filed: Feb. 25, 2020

(65) Prior Publication Data
US 2020/0192871 A1 Jun. 18, 2020

Related U.S. Application Data

(63) Continuation of application No. PCT/EP2017/071469, filed on Aug. 25, 2017.

(51) Int. Cl.
*G06F 16/174* (2019.01)
*G06F 16/16* (2019.01)
(Continued)

(52) U.S. Cl.
CPC ........ *G06F 16/1748* (2019.01); *G06F 16/152* (2019.01); *G06F 16/156* (2019.01); *G06F 16/162* (2019.01); *G06F 16/1824* (2019.01)

(58) Field of Classification Search
CPC ............... G06F 16/1748; G06F 16/162; G06F 16/1824; G06F 16/156; G06F 16/152
See application file for complete search history.

(56) References Cited

U.S. PATENT DOCUMENTS 7,523,098 B2 4/2009 Hirsch et al.
8,671,116 B2 * 3/2014 Jayaraman .......... G06F 16/1748
707/791

(Continued)

FOREIGN PATENT DOCUMENTS

CN 102541751 A 7/2012
CN 102567218 A 7/2012
(Continued)

OTHER PUBLICATIONS

Douglis et al., "The Logic of Physical Garbage Collection in Deduplicating Storage," Proceedings of the 15th USENIX Conference on File and Storage Technologies (FAST '17), Santa Clara, CA, pp. 1-17, USENIX Association, Berkeley, CA (Feb. 27-Mar. 2, 2017).

(Continued)

*Primary Examiner* — Hosain T Alam
*Assistant Examiner* — Anthony G Gemignani
(74) *Attorney, Agent, or Firm* — Leydig, Voit & Mayer, Ltd.

(57) ABSTRACT

An apparatus stores received data blocks as deduplicated data blocks. The apparatus is configured to: maintain a plurality of containers, where a reference to a container is unique within the apparatus and each container includes one or more data segments and segment metadata for each data segment, the segment metadata including a segment identifier and a segment reference, where the segment identifier is unique within the container and the segment reference is unique within the apparatus; and maintain a plurality of deduplicated data blocks storing received data blocks, where each deduplicated data block includes a plurality of identified container references, where a container reference identifier is unique within the deduplicated data block, and an ordered list of one or more segment indicators.

17 Claims, 10 Drawing Sheets

(51) Int. Cl.
 *G06F 16/182* (2019.01)
 *G06F 16/14* (2019.01)

(56) References Cited

U.S. PATENT DOCUMENTS

| | | | |
|---|---|---|---|
| 8,904,137 B1* | 12/2014 | Zhang | G06F 3/067 711/165 |
| 9,400,796 B2 | 7/2016 | Hirsch et al. | |
| 2012/0143835 A1* | 6/2012 | Aronovich | G06F 16/907 707/696 |
| 2012/0159098 A1 | 6/2012 | Cheung et al. | |
| 2013/0232125 A1* | 9/2013 | Huang | G06F 16/1756 707/692 |

FOREIGN PATENT DOCUMENTS

| | | |
|---|---|---|
| CN | 102893265 A | 1/2013 |
| CN | 103238140 A | 8/2013 |
| CN | 103473150 A | 12/2013 |
| CN | 104871155 A | 8/2015 |
| CN | 105917304 A | 8/2016 |
| CN | 107015888 A | 8/2017 |
| WO | 2011159322 A1 | 12/2011 |
| WO | 2016091282 A1 | 6/2016 |

OTHER PUBLICATIONS

Lillibridge et al., "Sparse Indexing: Large Scale, Inline Deduplication Using Sampling and Locality," Proceedings of the 7th Conference on File and Storage Technologies (FAST '09), San Francisco, CA, pp. 111-123, USENIX Association, Berkeley, CA (Feb. 25-27, 2009).

Lillibridge et al., "Improving Restore Speed for Backup Systems that Use Inline Chunk-Based Deduplication," Proceedings of the 11th USENIX Conference on File and Storage Technologies (FAST '13), Santa Clara, CA, pp. 183-198, USENIX Association, Berkeley, CA (Feb. 17-20, 2014).

Simha et al., "A Scalable Deduplication and Garbage Collection Engine for Incremental Backup," Proceedings of the 6th International Systems and Storage Conference (SYSTOR '13), pp. 1-12, Association for Computing Machinery, New York, NY (Jun. 30-Jul. 2, 2013).

Tridgell, "Efficient Algorithms for Sorting and Synchronization," PhD Thesis, pp. 1-115, The Australian National University, Acton, Australia (Feb. 1999).

Zhu et al., "Avoiding the Disk Bottleneck in the Data Domain Deduplication File System," Proceedings of the 6th USENIX Conference on File and Storage Technologies (FAST '08), pp. 1-14, USENIX Association, Berkeley, CA (Feb. 25-26, 2008).

LU "Design and Research on a High-Performance Deduplication System," Total 59 pages (Jul. 15, 2014).

\* cited by examiner

201 — Maintain a plurality of containers, wherein a reference to a container is unique and each container stores one or more data segments and segment metadata for each data segment, the segment metadata including a segment identifier and a segment reference, wherein the segment identifier is unique within the container and the segment reference is unique.

202 — Maintain a plurality of deduplicated data blocks storing received data blocks, wherein each deduplicated data block includes a plurality of identified container references, wherein a container reference identifier is unique within the deduplicated data block, and an ordered list of one or more segment indicators, wherein each segment indicator includes a segment identifier and the container reference identifier of the container reference of the container that contains the identified data segment, the order thereof being the same as data segments of the received data block.

203 — Maintain a deduplication index including a plurality of segment references or derivatives thereof, wherein each segment reference or derivative thereof is calculated from a data segment from a received data block and is associated at least with a container reference referenced by the deduplicated data block and one unique block reference to a deduplicated data block.

Fig. 2

Metadata of a conventional block

Fig. 9

APPARATUS AND METHOD FOR STORING RECEIVED DATA BLOCKS AS DEDUPLICATED DATA BLOCKS

CROSS-REFERENCE TO RELATED APPLICATIONS

This application is a continuation of International Application No. PCT/EP2017/071469, filed on Aug. 25, 2017, which is hereby incorporated by reference in its entirety.

FIELD

The present disclosure relates to an apparatus and to a corresponding method for deduplicating data.

BACKGROUND

It has become common practice to process backups in a way that removes data that has already been stored. Thereby, a process known as "deduplication" is used. Instead of storing duplicates, the deduplication process stores some form of references to where the data already stored is located. These references and other items stored "about" the data are commonly known as metadata.

Conventional metadata can in this case be as large as 1% of the received data. When the data deduplicates well, there are many duplicates, and the total metadata becomes a very significant part of the total storage that is required. For example, when the data duplicates in a ratio 25:1 and a SHA-1 hash is used for determining identity, 28% of the total storage is needed to hold the metadata.

Further, recently there have been doubts cast upon the security of SHA-1. However, a move to an SHA-2 hash would mean that for the deduplication process now even 33% of the total storage would be needed to hold the metadata.

Consequently, there is a need to find a possibility to decrease the percentage of total storage required for holding the metadata.

Conventional deduplication products store the complete hash (usually the SHA-1 hash) in their equivalent of the block metadata. This is the root cause of the large metadata, leading to the metadata bloat when deduplication works well.

Accordingly, if storing the complete hash in the block metadata could be avoided, the total amount of storage required for the metadata could be reduced.

FIG. 8 shows data structure of a conventional deduplication process. The data structure is divided into blocks, containers and segments. A block is a storage unit that represents the original data, which may contain duplicates. The blocks are the data received by the deduplication apparatus before deduplication. Blocks may be divided into data segments, which are sequences of consecutive bytes. A typical data segment length varies from product to product, however, a block may contain up to thousands of data segments.

After deduplication, the received block is stored as a list of its segments, referred to as the block's metadata. Furthermore, containers holding unique data segments are stored. Containers are storage units that represent unique deduplicated data, wherein a container may contain thousands of unique data segments. The data segment's metadata is for instance, its reference count, storage details and a strong hash calculated from the data segment. The metadata of the container is the data segment metadata of all its data segments.

Figure 9:
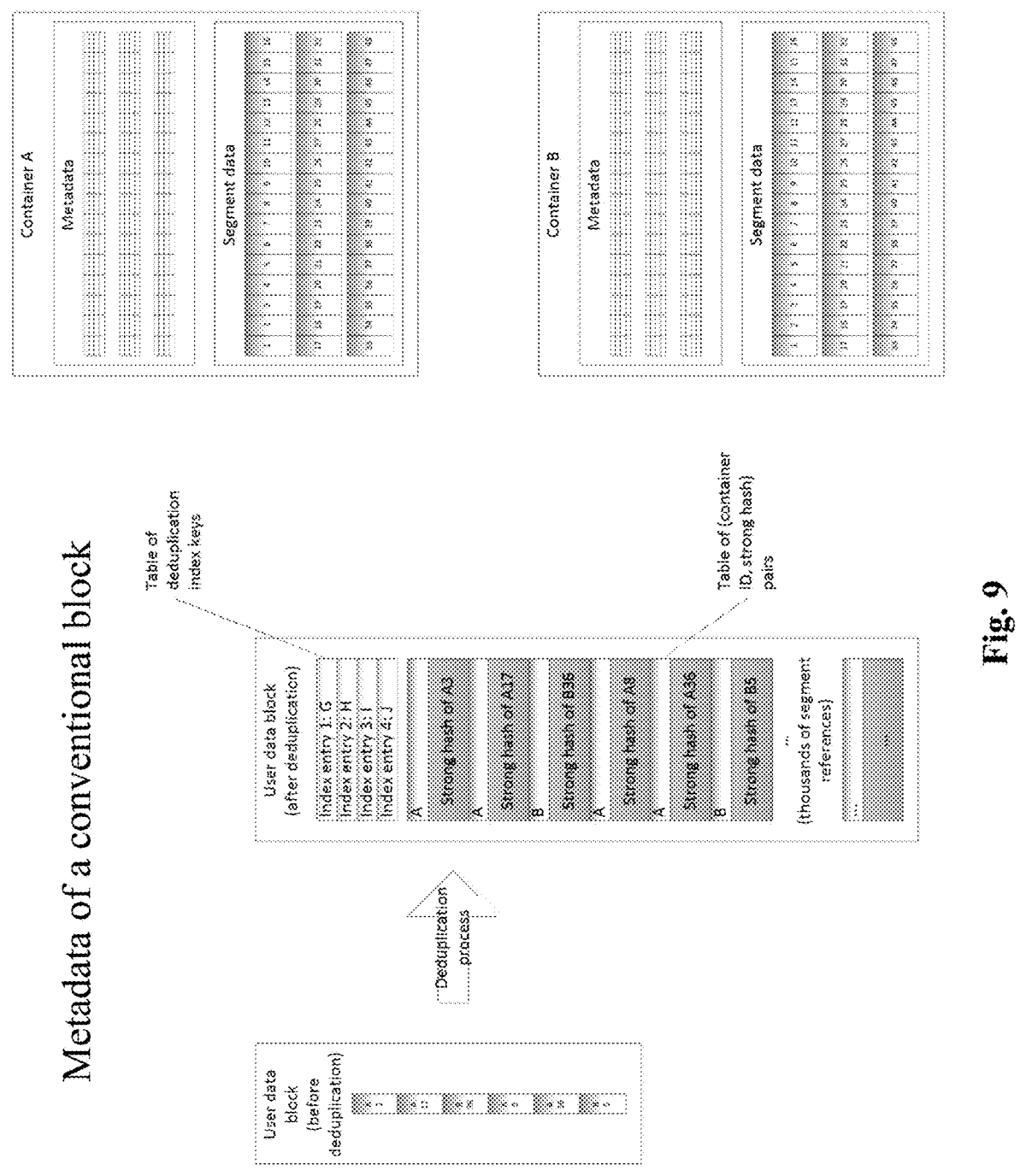

FIG. 9 shows details of the metadata of a conventional block, i.e. of the deduplicated data block. In FIG. 9 it can be seen that a user data block before deduplication is received, and after the deduplication process it is stored as a deduplicated data block including metadata. In particular, the deduplicated block includes a table of container IDs and strong hash value pairs. In other words, the metadata of the conventional blocks stores a strong hash value for each data segment of the received data block. These strong hash values require storage of 40 bytes each, and thus amount to a large amount of the total storage.

FIG. 10 shows details of a conventional deduplication index that is stored along with the deduplicated data blocks and containers. The conventional deduplication index includes a complete list of hash values of data segments (here G, I, J, K, L), wherein each hash value is associated with a reference to a block. This means, however, for a received block containing data segments, which can be calculated into hash values that can be searched for in the deduplication index, at first a deduplicated data block needs to be found from the associated block references in the deduplication index, and then from the retrieved deduplicated data block the container related to this block may be found. However, this indirection impacts negatively on the system performance, particularly the Inputs/Outputs (I/Os).

SUMMARY

In view of the above-mentioned problems and disadvantages, the present disclosure improves the conventional deduplication apparatus and methods. The present disclosure provides a deduplication apparatus and corresponding method, with which the total size of all metadata can be compacted, while improving system performance. In particular, the block metadata saved with the deduplicated data blocks, which is the main cause for the space overhead, should be reduced. Further, specifically the I/O performance should be increased, preferably by removing the above-mentioned indirection.

The present disclosure describes altering the data structures of the deduplication index, the deduplicated data blocks, and the containers, respectively, in order to solve the above-mentioned problem. That is, the disclosure provides a new design for these data structures, which increases performance and saves space when compared to the conventional data structure.

A first aspect of the present disclosure provides an apparatus for storing received data blocks as deduplicated data blocks. The apparatus is configured to: maintain a plurality of containers, where a reference to a container is unique within the apparatus and each container includes one or more data segments and segment metadata for each data segment, the segment metadata including a segment identifier and a segment reference, where the segment identifier is unique within the container and the segment reference is unique within the apparatus; maintain a plurality of deduplicated data blocks storing received data blocks, where each deduplicated data block includes a plurality of identified container references, where a container reference identifier is unique within the deduplicated data block, and an ordered list of one or more segment indicators, where each segment indicator includes a segment identifier and the container reference identifier of the container reference of the container that contains the identified data segment, the order thereof being the same as data segments of the received datablock; and maintain a deduplication index including a plurality of segment references or derivatives thereof, where each segment reference or derivative thereof is calculated from a data segment from a received data block and is associated at least with a container reference referenced by the deduplicated data block and one unique block reference to a deduplicated data block.

In the present disclosure, "unique" includes "probabilistically unique". For instance, a segment reference is at least probabilistically unique within the apparatus, which means that it identifies a data segment, from which it is calculated, with an almost absolute, very high probability. Also the block reference is at least probabilistically unique.

The new data structure of the plurality of containers, the plurality of deduplicated data blocks, and the deduplication index decreases the space required for storing all metadata, and at the same time increases the performance of the apparatus. This is particularly due to the fact that the deduplicated data blocks do not store any segment references, which in the conventional deduplicated data blocks are calculated hash values, but only a segment identifier. The segment identifier is smaller by about a factor of 20, so that the size of the deduplicated data blocks can be reduced significantly.

The increased performance comes due to the fact that the deduplication index now references containers directly with the container references associated with the segment references. Accordingly, the deduplication index is denormalized, which leads to an increase in size of the deduplication index. However, this increase lays the basis for decreasing information at other parts of the apparatus.

The segment identifier is also added to the metadata of each data segment in the containers. That is, the metadata of each segment now includes a segment identifier and a segment reference, which is also able to identify the data segment. That is, the segment identifier is in fact at first glance superfluous, and increases the complexity and overhead of the maintenance of the container. However, the added segment identifier is small, and contributes to the possibility to reduce the overall storage required.

The above sacrifices in the deduplication index and the container metadata enables the list of full hashes in conventional deduplicated data blocks to be replaced by the list of segment identifiers, providing the major amount of space saving, because this data is duplicated for every duplicate segment in the apparatus.

The changes in the data structure of the apparatus of the first aspect lead to a significant reduction of storage required, and a more efficient deduplication process. In fact, the overall space saved is close to 10% at a typical deduplication ratio of 8:1. This is achieved by redesigning the data structures for deduplication in a way that adds a small amount of storage, where unique data is stored (and the addition matters least), but saves space in reference to the deduplicated data (of which there are many copies).

In an implementation form of the first aspect, the apparatus is configured to, for storing a received data block as a deduplicated data block: receive the data block to be stored; segment the received data block into data segments; calculate a segment reference for each of the data segments; choose a subset of the segment references or derivatives thereof; search in the deduplication index for the segment references or derivatives thereof included in the subset of segment references and retrieve the container references associated with the segment references or derivatives thereof found in the deduplication index; retrieve the segment metadata from the containers referenced by the retrieved container references; search for the segment references of the received data block in the retrieved segment metadata; choose a plurality of containers possibly including new containers such that each data segment of the received data block is already stored in the plurality of containers and there is enough free space in the plurality of containers to store the data segments of the received data block that are not yet stored in any container of the plurality of containers; assign to each not yet stored data segment one storage container of the plurality of containers with sufficient space to store the not yet stored data segment and assign a new segment identifier unique within the storage container to the not yet stored data segment, and create segment metadata for the not yet stored data segment using the new segment identifier and the segment reference; and store the segment metadata and the data segment in the storage container.

In a further implementation form of the first aspect, the apparatus is further configured to, for storing a received data block as a deduplicated data block: construct a plurality of identified container references from the plurality of containers, where each container reference identifier is unique within the deduplicated data block; construct the ordered list of one or more segment indicators using the plurality of identified container references and the segment identifier of each data segment of the received data block; and store the deduplicated data block containing the plurality of identified container references and the ordered list of one or more segment indicators.

Conventionally, searches in the deduplication index return lists of existing stored deduplicated data blocks. Each deduplicated data block needed to be read, in order to provide the deduplication scope, and to build a list of containers. Then, each container metadata would need to be read to modify the segment metadata, for instance, including modifying a reference count. According to the above implementation forms of the first aspect, the searches of the deduplication index return a list of containers directly, i.e. the container references associated with the segment references or derivatives thereof found in the deduplication index. These segment references of all the data segments in these containers obtained from the container's metadata are now the deduplication scope. That is, there is no need to read existing deduplicated data blocks. This increases I/O performance compared to the conventional process.

Accordingly, the apparatus is configured to store a received data block as a deduplicated data block more efficiently with increased performance, and with less space required.

In a further implementation form of the first aspect, each deduplicated data block further includes the subset of the segment references or derivatives thereof.

This subset serves as deduplication index keys and consists of a number of characteristic segment references. Using only these segment references, instead of all segment references calculated from all data segments of the block, the possibility to find all data segments of the block in the container is high, while requiring less processing and less storage space.

In a further implementation form of the first aspect, the subset of the segment references or derivatives thereof of each duplicated data block includes a number N of segment references or derivatives thereof, which are selected from a number M of segment references or derivatives thereof calculated from its M data segments, where N is smaller than M, and N is preferably 4.

Selecting 4 segment references, for example strong hash values, as index keys, provides a very high possibility of finding the data segments from the containers. Increasing this number N increases the possibility, while also increasing the processing load.

In a further implementation form of the first aspect, the apparatus is configured to, for retrieving a received data block: retrieve the stored deduplicated data block of the received datablock; retrieve for each container reference identifier and each segment identifier of each segment indicator of the ordered list of one or more segment indicators in the deduplicated data block, the data of the identified segment from the identified referenced container; and reconstruct the received data block from the retrieved data of the identified segments of the identified referenced containers, according to the order of the ordered list of one or more segment indicators in the deduplicated data block.

The data block can be reconstructed quickly even with the new data structure, which allows saving significant space.

In a further implementation form of the first aspect, the apparatus is configured to, for deleting a data block: retrieve the deduplicated data block related to the data block to be deleted; retrieve, for each container referenced by a container reference in the retrieved deduplicated data block, the segment identifiers and segment references, and search for each segment reference or derivative thereof included in the retrieved deduplicated data block in the deduplication index, in order to retrieve its associated at least one container reference and block reference; and delete the retrieved duplicated data block and delete each container reference and block reference that matches the container reference in the data block to be deleted and a reference of the data block to be deleted, respectively, from the deduplication index.

Again, like for the storing of a received data block described above, the search for the segment references in the deduplication index returns a list of container references directly, such that the performance is increased.

In a further implementation form of the first aspect, the segment metadata of each data segment in the plurality of containers further includes a reference count, and the apparatus is configured to increase the reference count, when it stores a data block containing that data segment, and to decrease the reference count, when it deletes a data block containing that data segment.

The reference count helps to maintain the containers and the data segments stored therein.

In a further implementation form of the first aspect, a segment reference calculated from a data segment is a hash value, preferably a strong hash value.

Hash values, particularly strong hash values, provide high security, and probabilistically unique identification of data segments, with compact data size.

In a further implementation form of this first aspect, the size of a segment indicator in a deduplicated data block is 16 bits or less.

The segment indicator is thus 2 bytes, whereas a conventional deduplicated data block stores segment references (full hashes), which are 40 bytes. That means, with the deduplicated data blocks in the apparatus of the present disclosure, the storage required is significantly decreased.

In a further implementation form of the first aspect, a segment identifier is an integer, preferably a 14-bit integer.

Accordingly, only a small amount of data needs to be added to the container metadata, but leads to a significant reduction of size for the deduplicated data blocks.

In a further implementation form of the first aspect, the size of a block reference in the deduplication index is between 1 and 8 bytes, and is preferably 4 bytes.

That is, only a small amount of data needs to be added to the deduplication index, in order to enable an increased system performance.

A second aspect of the present disclosure provides a method for storing received data blocks as deduplicated data blocks. The method includes the steps of: maintaining a plurality of containers, where a reference to a container is unique within the apparatus and each container includes one or more data segments and segment metadata for each data segment, the segment metadata including a segment identifier and a segment reference, where the segment identifier is unique within the container and the segment reference is unique; maintaining a plurality of deduplicated data blocks storing received data blocks, where each deduplicated data block includes a plurality of identified container references, where a container reference identifier is unique within the deduplicated data block, and an ordered list of one or more segment indicators, where each segment indicator includes a segment identifier and the container reference identifier of the container reference of the container that contains the identified data segment, the order thereof being the same as data segments of the received data block; and maintaining a deduplication index including a plurality of segment references or derivatives thereof, where each segment reference or derivative thereof is calculated from a data segment from a received data block and is associated at least with a container reference referenced by the deduplicated data block and one unique block reference to a deduplicated data block.

In an implementation form of the second aspect, the method further includes, for storing a received data block as a deduplicated data block: receiving the data block to be stored; segmenting the received data block into data segments; calculating a segment reference for each of the data segments; choose a subset of the segment references or derivatives thereof; searching in the deduplication index for the segment references or derivatives thereof included in the subset of segment references and retrieving the container references associated with the segment references or derivatives thereof found in the deduplication index; retrieving the segment metadata from the containers referenced by the retrieved container references; searching for the segment references of the received data block in the retrieved segment metadata; choosing a plurality of containers possibly including new containers such that each data segment of the received data block is already stored in the plurality of containers and there is enough free space in the plurality of containers to store the data segments of the received data block that are not yet stored in any container of the plurality of containers; assigning to each not yet stored data segment one storage container of the plurality of containers with sufficient space to store the not yet stored data segment and assigning a new segment identifier unique within the storage container to the not yet stored data segment, creating segment metadata for the not yet stored data segment using the new segment identifier and the segment reference; and storing the segment metadata and the data segment in the storage container.

In a further implementation form of the second aspect, the method further includes, for storing a received data block as a deduplicated data block: constructing a plurality of identified container references from the plurality of containers, where each container reference identifier is unique within the deduplicated data block; constructing the ordered list of one or more segment indicators using the plurality of identified container references and the segment identifier of each data segment of the received data block; and storing the deduplicated data block containing the plurality of identified container references and the ordered list of one or more segment indicators.

In a further implementation form of the second aspect, the method further includes, for retrieving a received data block: retrieving the stored deduplicated data block of the received data block; retrieving for each container reference identifier and each segment identifier of each segment indicator of the ordered list of one or more segment indicators in the deduplicated data block, the data of the identified segment from the identified referenced container; and reconstructing the received data block from the retrieved data of the identified segments of the identified referenced containers, according to the order of the ordered list of one or more segment indicators in the deduplicated data block.

In a further implementation form of the second aspect, the method includes, for deleting a data block: retrieving the deduplicated data block related to the data block to be deleted; retrieving, for each container referenced by a container reference in the retrieved deduplicated data block, the segment identifiers and segment references; and searching for each segment reference or derivative thereof included in the retrieved deduplicated data block in the deduplication index, in order to retrieve its associated at least one container reference and block reference, deleting the retrieved deduplicated data block and deleting each container reference and block reference that matches the container reference in the data block to be deleted and a reference of the data block to be deleted, respectively, from the deduplication index.

In a further implementation form of the second aspect, the segment metadata of each data segment in the plurality of containers further includes a reference count, and the method includes increasing the reference count, when it stores a data block containing that data segment, and to decrease the reference count, when it deletes a data block containing that data segment.

In a further implementation form of the second aspect, a segment reference calculated from a data segment is a hash value, preferably a strong hash value.

In a further implementation form of this first aspect, the size of a segment indicator in a deduplicated data block is 16 bits or less.

In a further implementation form of the second aspect, a segment identifier is an integer, preferably a 14-bit integer.

In a further implementation form of the second aspect, the size of a block reference in the deduplication index is between 1 and 8 bytes, and is preferably 4 bytes.

With the method of the second aspect and its implementation forms, the same benefits and facts described above for the apparatus of the first aspect and its implementation forms, respectively, can be achieved.

A third aspect of the present disclosure provides a computer program product including a program code for controlling an apparatus according to the first aspect or any of its implementation forms or for performing, when running on a computer, the method according to the second aspect or its implementation forms.

Accordingly, the computer program product of the third aspect achieves all benefits and effects of the apparatus of the first aspect, and the method of the second aspect, respectively.

A fourth aspect of the present disclosure provides a computer-implemented data structure embodied on a medium. The data structure includes a plurality of containers, a reference to a container being unique within the apparatus and each container including one or more data segments and segment metadata for each data segment. The segment metadata including a segment identifier and a segment reference, the segment identifier being unique within the container and the segment reference being unique within the apparatus. The data structure also includes a plurality of deduplicated data blocks storing received data blocks, each deduplicated data block including a plurality of identified container references. A container reference identifier is unique within the deduplicated data block. The data structure also includes an ordered list of one or more segment indicators, each segment indicator including a segment identifier and the container reference identifier of the container reference of the container that contains the identified data segment, the order thereof being the same as data segments of the received data block, and a deduplication index including a plurality of segment references or derivatives thereof. Each segment reference or derivative thereof is calculated from a data segment from a received data block and is associated at least with a container reference referenced by the deduplicated data block and one unique block reference to a deduplicated data block.

With the data structure of the fourth aspect, the same advantages and effects as described for the previous aspects are achieved.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above-described aspects and implementation forms of the present disclosure will be explained in the following description of exemplary embodiments in relation to the enclosed drawings, in which:

FIG. 2 shows a method according to an embodiment of the present disclosure;

FIG. 9 shows metadata of a conventional block, i.e. a conventional deduplicated data block in more detail.

DETAILED DESCRIPTION

Figure 1:
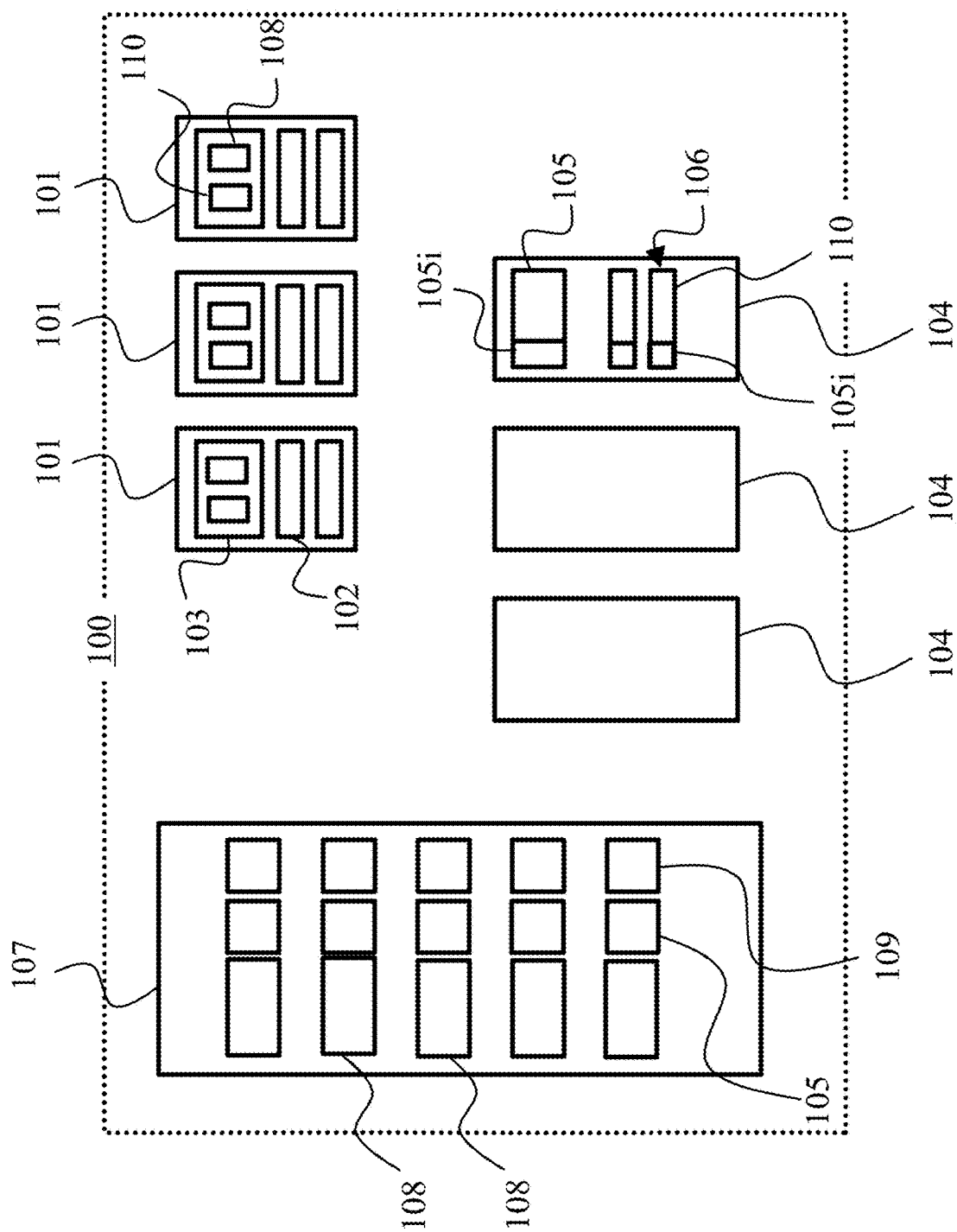
FIG. 1 shows an apparatus according to an embodiment of the present disclosure.

FIG. 1 shows an apparatus 100 according to an embodiment of the present disclosure, the apparatus being configured to store received data blocks 300 as deduplicated data blocks 104. To this end, the apparatus 100 is configured to maintain a data structure having a plurality of containers 101, a plurality of the deduplicated data blocks 104, and a deduplication index 107.

Each container 101 includes one or more data segments 102, preferably unique data segments. Further, each container 101 includes segment metadata 103 for each of the data segments 102. The segment metadata 103 includes a segment identifier 110 and a segment reference 108. The segment reference 108 may be calculated from the data segments and may be a hash value or a strong hash value.

Each segment identifier 110 is unique within the container 101, preferably absolutely unique. That means, preferably each segment identifier 110, which may be an integer, is used only once within a container 101, but may be used in an identical manner in another container 101. Further, a segment reference 108 of a data segment 102 is unique, preferably probabilistically unique, within the apparatus 100. That means, a segment reference 108 preferably identifies a data segment 102, from which it is calculated, with an almost absolute probability. Of course, if a data segment 102 is used in different apparatus 100, identical segment references 108 may be calculated and maintained in each apparatus. Furthermore, it is noted that any reference 105 to a container 101 is unique within the apparatus 100. That is, if a container reference 105 is stored somewhere in the apparatus 100, it identifies exactly one of the containers 101.

The deduplicated data blocks 104 are for storing received data blocks 300. To this end, the deduplicated data block 104 includes a plurality of identified container references 105, that means a container reference 105 associated with a container reference identifier 105i. The container reference identifier 105i is unique, preferably absolutely unique, within the deduplicated data block 104. That means, it is preferably used only once in this deduplicated data block 104, but may be used in an identical manner in another deduplicated data block 104. The deduplicated data block 104 also includes an ordered list of one or more segment indicators 106, each segment indicator 106 including a segment identifier 110 and the container reference identifier 105i of the container reference 105 of the container 101 that contains the identified data segment 102. The segment identifier 110 stored in the segment indicator 106, and the segment identifier 110 identifying the data segment 102 in the container 101 are the same. It is further noted that the order of the list of the one or more segment indicators 106 is the same order as of the data segments 102 of the received data block 300 that is stored.

The deduplication index 107 includes a plurality of segment references 108, which may again be hash values or strong hash values, or derivatives thereof. A derivative of a segment reference 108 means, for example, the result of a well-determined mathematical operation carried out on the segment reference 108, where the result is still able to at least probabilistically identify the data segment 102, from which the segment reference 108 was calculated. Each segment reference 108 or derivative thereof is calculated from a data segment 102 from a received data block 300 and is associated at least with a container reference 105 referenced by the deduplicated data block 104, which stores the received data block 300, and one unique, preferably probabilistically unique block reference 109 to a deduplicated data block 104. Again, probabilistically unique means that the block reference 109 is with an almost certain probability able to identify exactly one of the deduplicated data blocks 104.

FIG. 2 shows a method 200 according to an embodiment of the present disclosure. The method is for storing a received data block 300 as a deduplicated data block 104. The method 200 corresponds to the configuration of the apparatus 100 shown in FIG. 1, and can particularly be carried out by said apparatus 100. The method 200 includes "method steps" 201, 202 and 203, which, however, do not have to be carried out in any particular order, and can reflect the continuous operation of an apparatus 100.

In the step 201, the method 200 maintains a plurality of containers 101, where a reference to a container 101 is unique within the apparatus 100, and each container 101 stores one or more data segments 102 and segment metadata 103 for each data segment 102, the segment metadata 103 including a segment identifier 110 and a segment reference 108, where the segment identifier 110 is unique within the container 101 and the segment reference 108 is unique. If the method 200 is carried out by the apparatus 100, the segment reference 108 is unique within the apparatus 100.

The step 202 maintains a plurality of deduplicated data blocks 104 storing received data blocks 104, where each deduplicated data block 104 includes a plurality of identified container references 105, where a container reference identifier 105i is unique within the deduplicated data block 104, in an ordered list of one or more segment indicators 106, where each segment indicator 106 includes a segment identifier 110 and the container reference identifier 105i of the container reference 105 of the container 101 that contains the identified data segment 102, and the order thereof being the same as data segments 102 of the received data block 300.

The step 203 maintains a deduplication index 107 including a plurality of segment references 108 or derivatives thereof. Each segment reference 108 or derivative thereof is calculated from a data segment 102 of a received data block 300 and is associated at least with a container reference 105 referenced by the deduplicated data block 104 storing the received data block 104 and one unique block reference 109 to a deduplicated data block 104.

Figure 3:
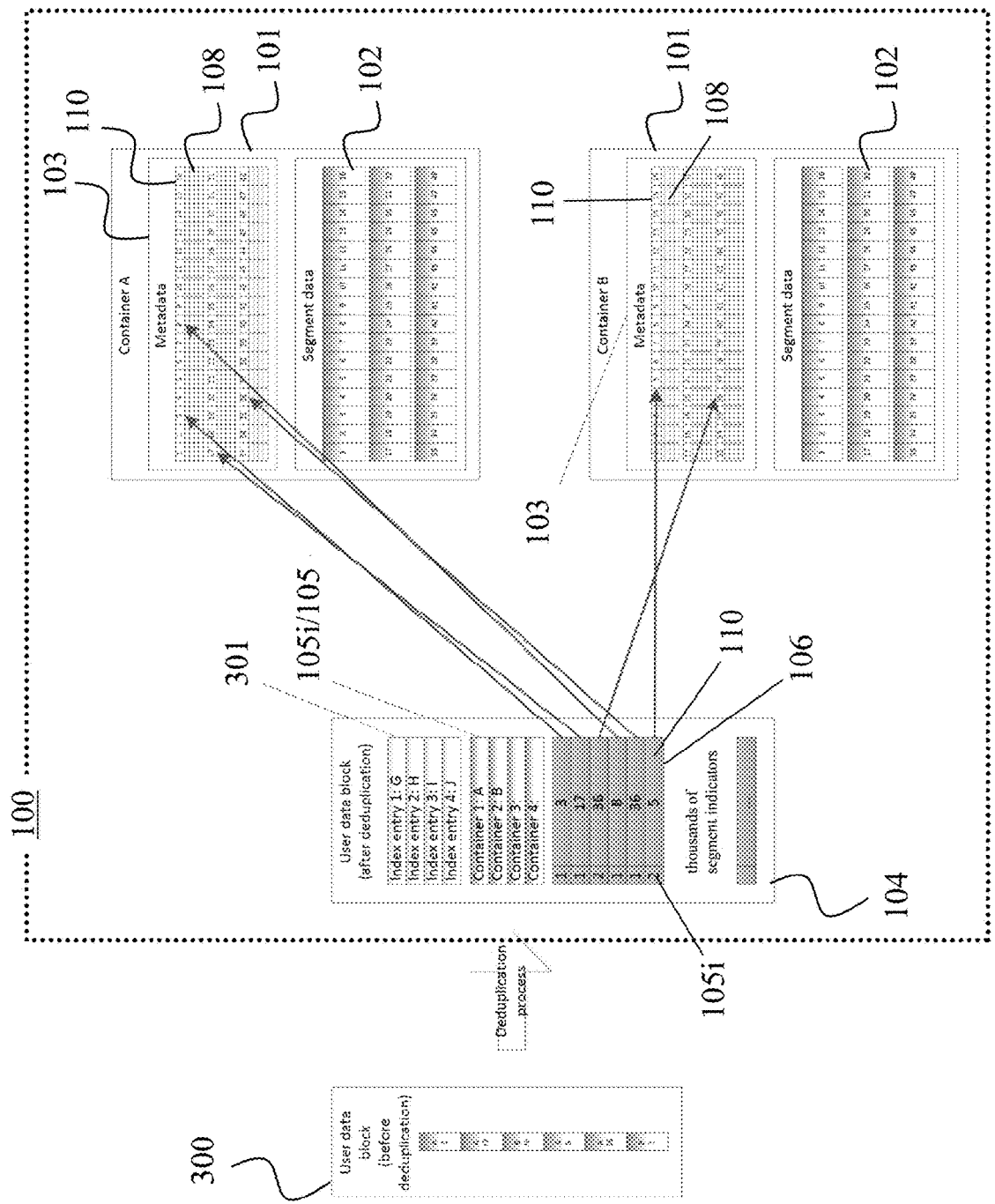
FIG. 3 shows an apparatus according to an embodiment of the present disclosure.

FIG. 3 shows an apparatus 100 according to an embodiment of the present disclosure, which builds on the apparatus 100 shown in FIG. 1. In particular, it is shown in FIG. 3 that the apparatus 100 receives a data block 300, for instance, so that this received data block 300 is stored. The received data block 300 may be a user data block that is to be backed up. The received data block 300 is provided to the apparatus 100, so that the apparatus 100 carries out the deduplication process.

The apparatus 100 again includes a plurality of deduplicated data blocks 104 (only one deduplicated data block 104 is, however, shown), a plurality of containers 101, and a deduplication index 107 (not shown in FIG. 3). FIG. 3 particularly shows the details of a deduplicated data block 104. It can be seen that the deduplicated data block 104 includes a plurality of segment indicators 106, where there can be particularly thousands of such segment indicators. Each segment indicator 106 is an ordered list that is in the order of the data segments 102 of the received data block 300. Further, each segment indicator includes a container reference identifier 105*i* (here '1' or '2'). This container reference identifier 105*i* is also stored for identification of a plurality of container references 105 (here 'A', 'B'). Preferably, each deduplicated data block 104 also includes, as shown in FIG. 3, a subset 301 of segment references 108 or derivatives thereof. This subset 301 is chosen as deduplication index keys, i.e. for identifying the data block. The subset 301 is in particularly chosen from segment references 108 calculated for each data segment 102 of the corresponding received data block 300.

FIG. 3 shows also that each container 101 (here containers 'A' and 'B') includes a plurality of unique data segments 102, and segment metadata 103. The segment metadata 103 includes a segment reference 108 for each data segment 102, and an associated segment identifier 110.

Figure 4:
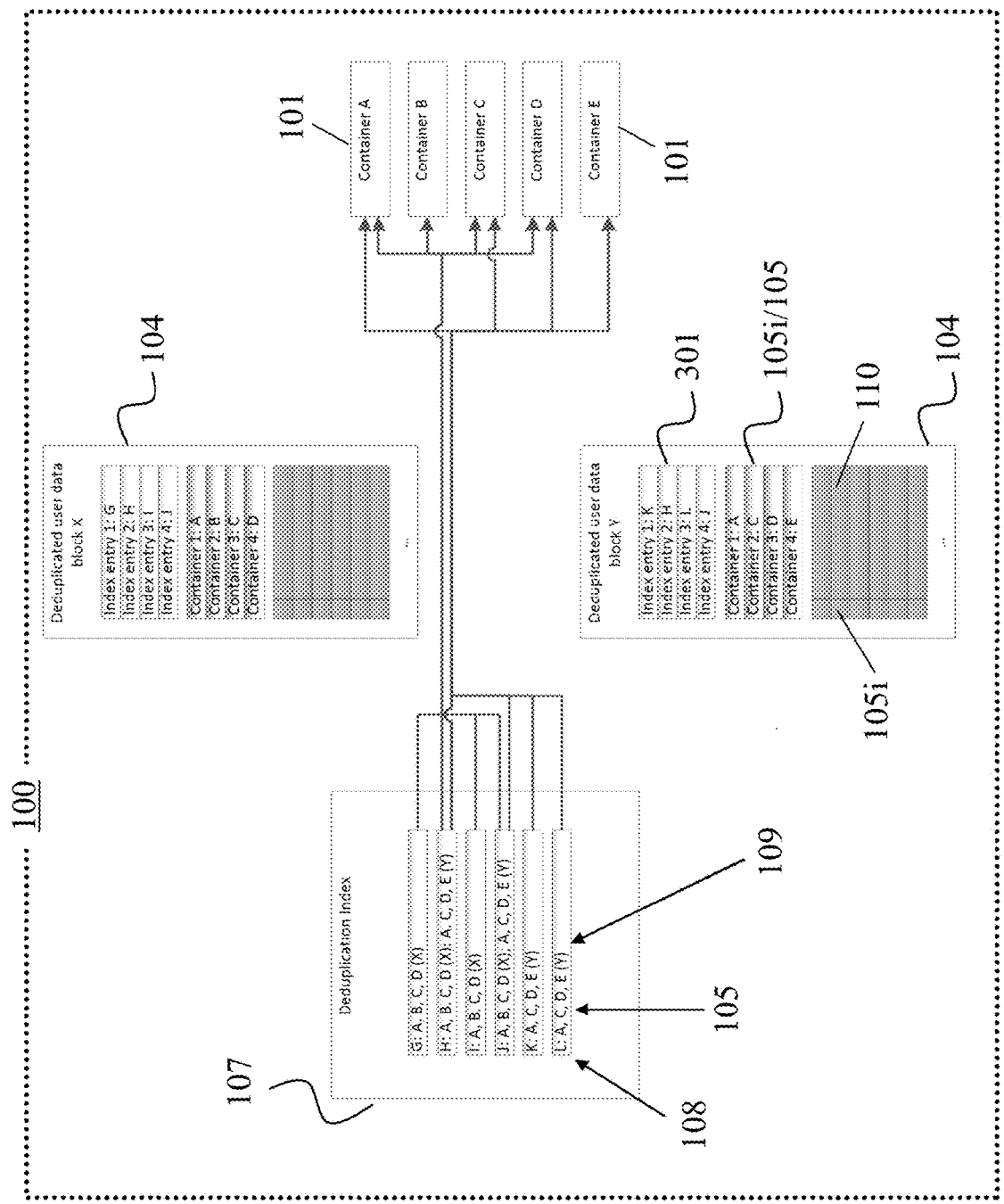
FIG. 4 shows an apparatus according to an embodiment of the present disclosure.

FIG. 4 shows an apparatus 100 according to an embodiment of the present disclosure, which builds on the apparatus 100 shown in the FIGS. 1 and 3. FIG. 4 shows specifically a data structure of the deduplication index 107. Again, the apparatus 100 maintains a plurality of deduplicated data blocks 104 (here blocks 'X' and 'Y' are shown) and a plurality of containers 101 (here containers 'A'-'E' are shown) and a deduplication index 107. The deduplication index 107 includes a plurality of segment references 108 or derivatives thereof, wherein each segment reference 108 is calculated from a data segment 102 of a received data block 300. In the deduplication index 107, each data segment 102 is associated with at least a container reference 105 (here 'A'-'E') and one unique block reference 109 (here 'X' and 'Y') to the deduplicated data blocks 104.

The data structure shown in the apparatus 100 of the FIGS. 1, 3 and 4 saves significant space required for storing the deduplicated data, and increases the processing of the apparatus 100 when storing a received data block 300 as a deduplicated data block 104, when deleting a data block, and also when retrieving a data block.

In the following, it is explained in detail how the apparatus 100 shown in the FIGS. 3 and 4 stores a received data block 300 as a deduplicated data block 104, retrieves a received data block 300, and deletes a data block.

For storing a data block 300 as a deduplicated data block 104, at first a data block 300 is input into the apparatus 100, that means the apparatus 100 receives the data block 300 to be stored. Such a data block 300 typically has a size of 4 MB. Then the apparatus 100 segments the received data block 300 into data segments using a segmentation algorithm. Segmentation is also known as chunking, and segmentation algorithms are well-known. An average size of a data segment is typically 4 kB.

The apparatus 100 is then configured to calculate a segment reference 108 for each of the data segments 102, wherein a segment reference 108 is for instance a strong hash value. Then, the apparatus chooses a subset 301 of the segment references 108. The choosing may be based on a certain calculation. The apparatus 100 then searches in the deduplication index 107 for these segment references 108 or derivatives thereof that are included in the subset 301. That is, the segment references 108 or derivatives thereof in the subset 301 function as keys in the deduplication index 107. The search in the deduplication index 107 returns container references 105 associated with the segment references 108 that have been found. These references 105 point to the containers 101 that contain the data segments 102 of some block or blocks whose deduplication index representation contains one of the segment references 108 in the subset 301.

The apparatus 100 is accordingly configured to now retrieve the segment metadata 103 from the containers 101 referenced by the retrieved container references 105. The segment metadata 103 includes the segment reference 108 of the data segment 102, for instance the strong hash, and the segment identifier 110 of the data segment 102 in the context of the container 101 that contains it. The segment identifier 110 may be a 14-bit integer.

The apparatus 100 now searches for the segment references 108 of the received data block 300 in the retrieved segment metadata 103, that is, it searches for the segment reference 108 among all the segment references 108 of all the segment metadata 103 of all the containers 101 retrieved previously.

The apparatus 100 then chooses a plurality of containers 101 possibly including new containers 101 such that each data segment 102 of the received data block 300 is already stored in the plurality of containers 101 and there is enough free space in the plurality of containers 101 to store the data segments 102 of the received data block 300 that are not yet stored in any container 101 of the plurality of containers 101. For instance, the apparatus 100 calculates an optimal set of at most N containers 101 that will contain all the data segments 102 of the received data block 300, and have space to store the data segments 102 of the data block 300 not found in any of the containers 101 in the optimal set of containers 101. Alternatively, the apparatus 100 may calculate an optimal set at of of at most N−1 containers 101, to which will be added any other container 101 that thus have space to store the data segments 102 of the received data block 300 that are found in any of the other N−1 containers 101. Specifically, N can be an integer, preferably 4.

Then, the apparatus 100 assigns to each not yet stored data segment 102 one storage container 101 of the plurality of containers 101 with sufficient space to store the not yet stored data segment 102, and assigns a new segment identifier 110 unique within the storage container 101 to the not yet stored data segment 102 and creates segment metadata 103 for the not yet stored data segment 102 using the new segment identifier 110 and the segment reference 108 and stores the segment metadata 103 and the data segment 102 in storage container 101. For instance, for each data segment 102 in the received data block 300 that is not already stored in the optimal set of containers 101, the apparatus 100 may assign a unique segment identifier 110 in the context of the container 101, at which it will be stored and stored in that container 101. It also assigns an index in the range 0 to at most N−1 to each of the containers 101 in the optimal container 101 set. This index will be used to identify the container 101 in the context of the received data block 300.

Accordingly, the apparatus 100 constructs a plurality of identified container references 105 on the plurality of containers 101, wherein each container reference identifier 105*i* is unique within the deduplicated data block 104.

Possibly, for each data segment in the received data block 300, the apparatus 100 adds some kind of record associated with the data segment 102 in the container 101 that contains it that this block requires and/or references that data segment 102.

Then, the apparatus 100 constructs the ordered list of one or more segment indicators 106 using the plurality of identified container references 105 in the segment identifier 110 of each data segment 102 of the received data block 300. The information contained in the deduplicated data block 104 is now complete and the deduplicated data block containing the plurality of container references 105 and the list of one or more segment indicators 106 is stored persistently.

Then, the apparatus 100 can update the deduplication index 107 with the container references referenced by this deduplicated data block 104 and the block reference to that deduplicated data block 104.

For retrieving a received data block 300, the apparatus 100 may at first receive the block references of the data block 300 to be retrieved. Then, the apparatus 100 is configured to retrieve the deduplicated data block 104 of the received data block 300 to memory. Then, it retrieves for each container reference identifier 105$i$ and each segment identifier 110 of each segment indicator 106 of the ordered list of one or more segment indicators 106 and the deduplicated data block 104 the data of the identified data segments 102 from the identified reference container 101. For instance, it may first receive for each container referenced in the deduplicated data block 104 the container metadata including the segment metadata 103 of all data segments 102, may then open an empty output data stream, and may then use the container meta data of the container 101 with the container reference 105 to find the storage location of the data segment 102, whose segment identifier 110 is given in the entry. Then it retrieves the data of the data segment 102, and adds it to the output stream.

The apparatus 100 then reconstructs the received data block 300 from the received data of the identified data segments of the identified referenced containers 101, according to the order of the ordered list of one or more segment indicators 106 in the deduplicated data block 104.

The apparatus 100 may then close the output data stream.

For deleting a data block, the apparatus 100 may again be configured to receive the block reference of the block to be deleted. Then, the apparatus 100 retrieves the deduplicated data block 104 related to the data block to be deleted to memory. Then it retrieves, for each container 101 referenced by a container reference 105 in the retrieved deduplicated data block 104 the segment identifiers 110 and segment references 108. Then it searches for each segment reference 108 or derivative thereof in the retrieved deduplicated data block 104 in the deduplication index 107, in order to retrieve its associated at least one container reference 105 and block reference 109. The included segment references 108 may be the subset 301 acting as index keys for the deduplication index 107.

The apparatus 100 then deletes the retrieved deduplicated data block 104 from persistent storage. Then, it deletes each container reference 105 and block reference 109 that matches the container reference 105 and the data block to be deleted and a block reference 109 of the data block to be deleted, respectively, from the deduplication index 107. The information in the deduplication index 107 is preferably updated accordingly, or removed, if it becomes empty.

Figure 5:
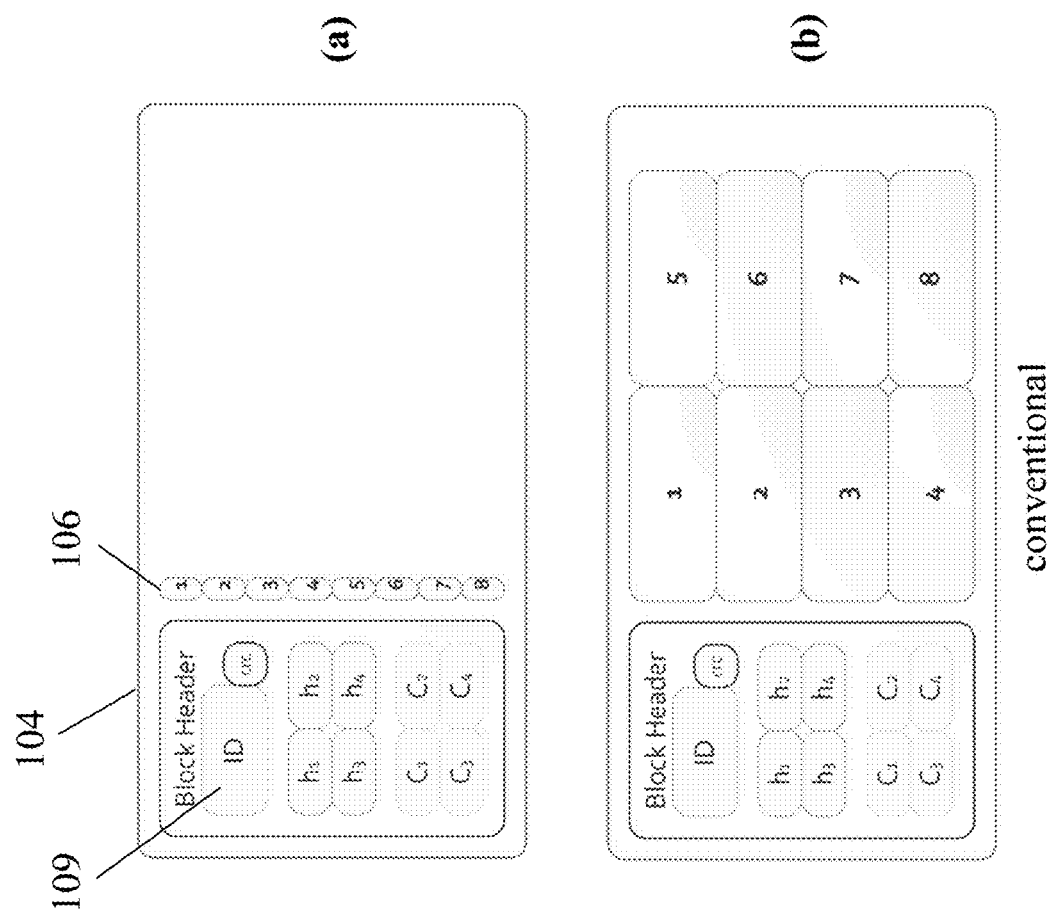
FIG. 5 shows a deduplicated data block as used in an apparatus according to an embodiment of the present disclosure compared with a conventional deduplicated data block.

FIG. 5 shows a deduplicated data block 104 in an apparatus 100 according to an embodiment of the present disclosure (in FIG. 5$a$) compared to a conventional deduplicated data block (in FIG. 5$b$). The conventional deduplicated data block is the most space-consuming metadata, since it contains a segment instance for each 4 kB of user data (containing duplicates) on average. That means, in 1 GB of user data, there will be 262144 data segments 102 on average. The size of a data segment reference 108 is conventionally 40 bytes, which totals in 10.6 MB.

The deduplicated data block 104 according to the embodiments of the present disclosure, includes not any more a segment reference 108, but only a segment indicator 106 including a segment identifier 110. The size of a segment indicator 106 is reduced to 2 bytes, so that in average this totals now only to 552 kB. Of the 2 bytes of the segment indicator 106, the container identifier 105$i$ is 2 bits indexing into a table of up to 4 containers 101, and a segment identifier 110 of 14 bits. Notably, the block reference 109 of the deduplicated data block 104 is included in a block header.

Figure 6:
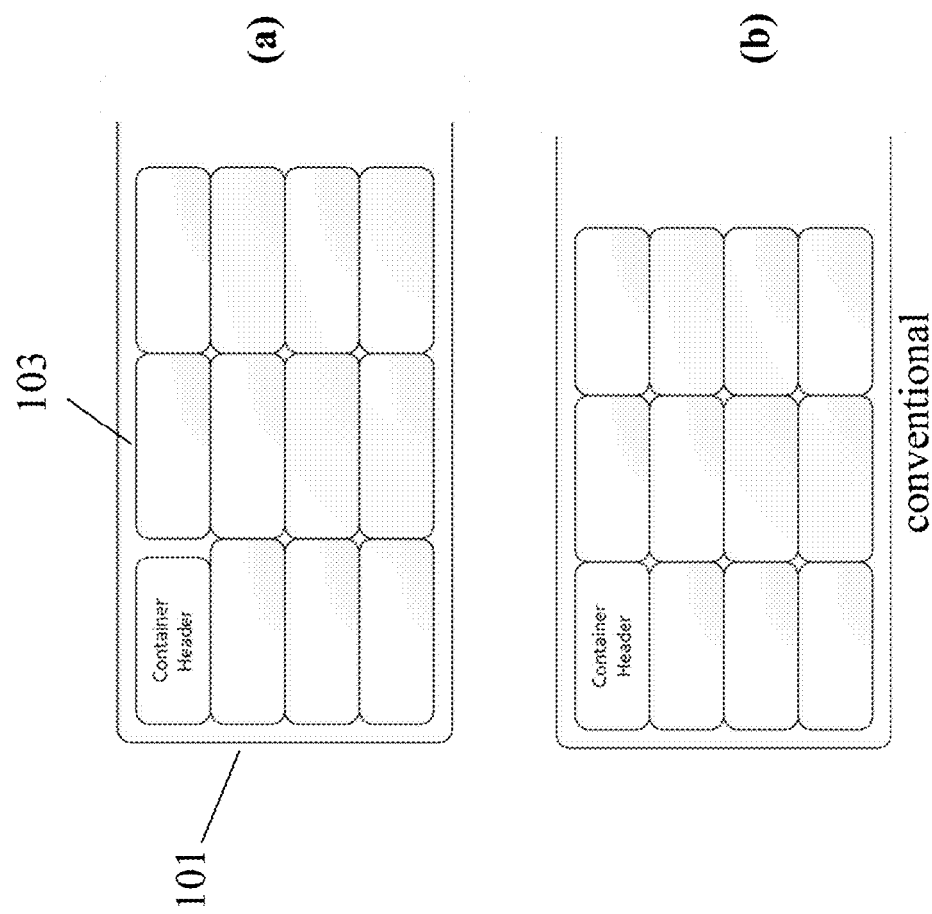
FIG. 6 shows a container as used in an apparatus according to an embodiment of the present disclosure compared with a conventional container.

FIG. 6 shows a container 101 used in an apparatus 100 according to embodiments of the present disclosure (in FIG. 6$a$) compared to a conventional container (in FIG. 6$b$). The containers 101 save a segment identifier 110 for each data segment 102. This frees all container maintenance including defragmentation from preserving segment order. Containers 101 are committed to preserving the segment identifier 110 as the unique identifier of the data segment 102 in the scope of the container 101. The addition of the segment identifier 110 causes a small increase in the segment metadata 103, but since in the container's case, it is one unique segment metadata 103 per 4 kB, only 419 kB of metadata are required compared to conventionally 377 kB. This is valid per 1 GB of unique user data at a 25:1 deduplication ratio.

Figure 7:
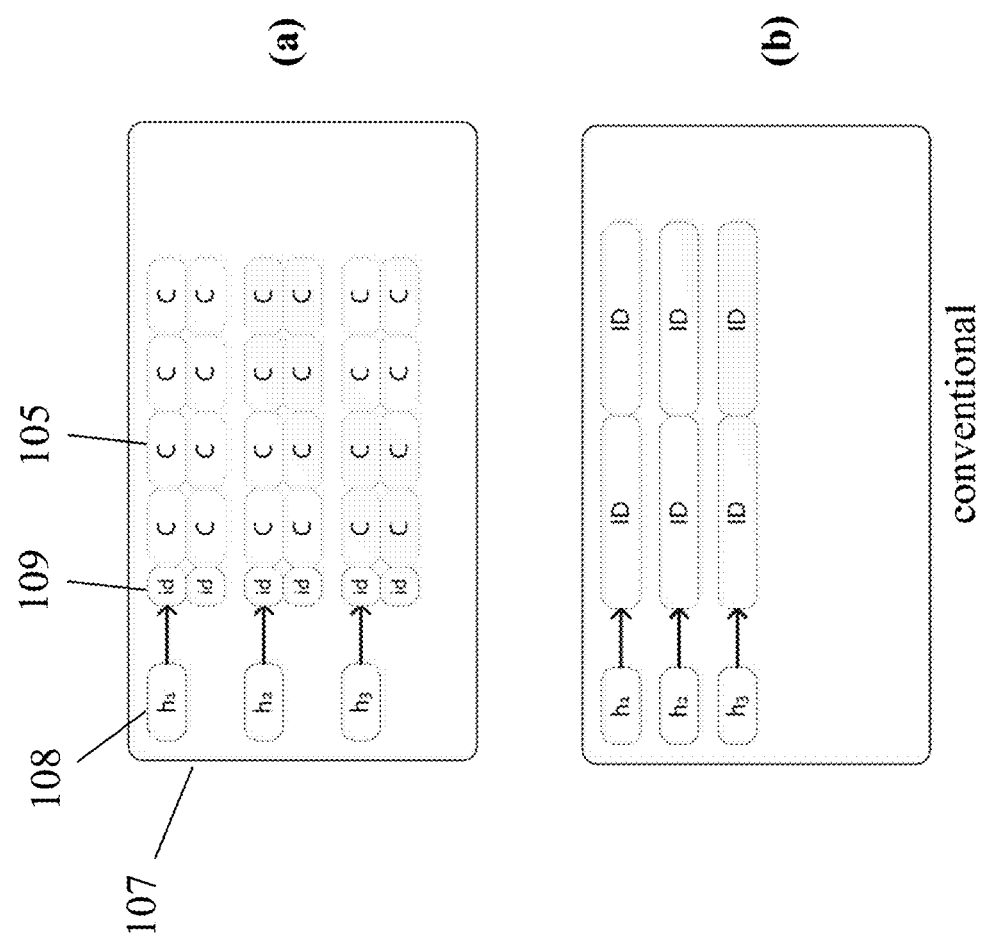
FIG. 7 shows a deduplication index as used in an apparatus according to an embodiment of the present disclosure compared with a conventional deduplication index.
Figure 8:
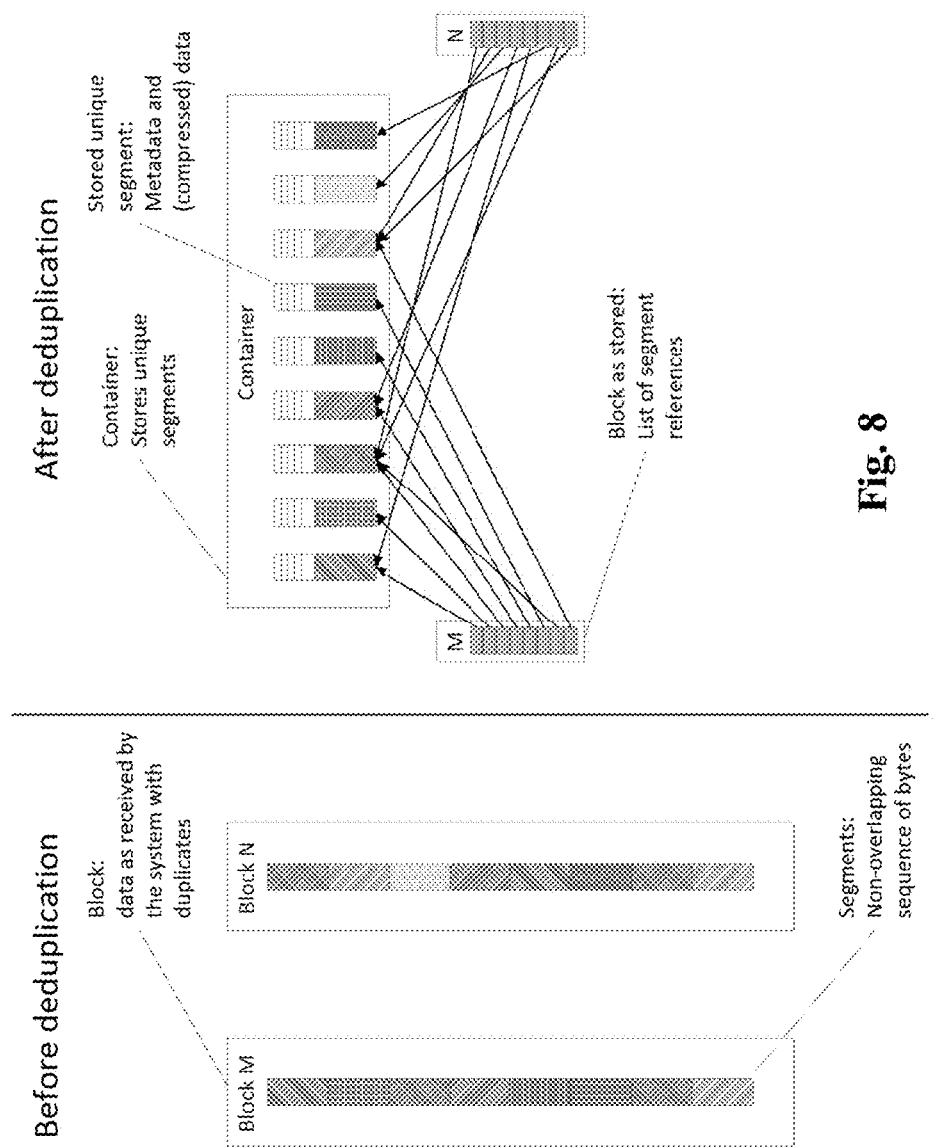
FIG. 8 shows a conventional deduplication process.
Figure 10:
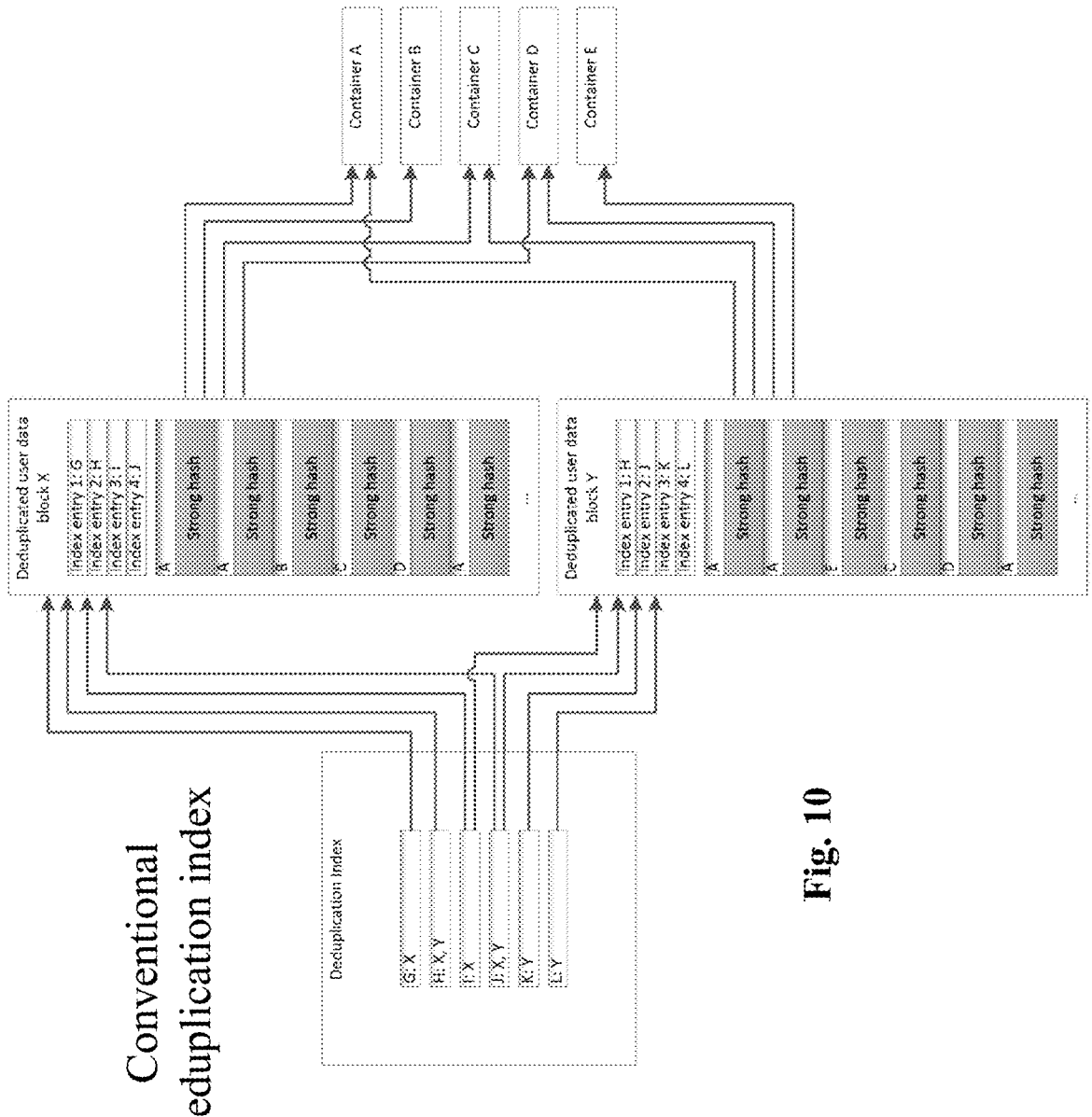
FIG. 10 shows a conventional deduplication index in more detail.

FIG. 7 shows a deduplication index 107 used in an apparatus 100 according to embodiments of the present disclosure (in FIG. 7$a$) compared with a conventional deduplication index (in FIG. 7$b$). The deduplication index 107 is in fact the least significant in terms of size, but in order to delete entries more efficiently, information that relates to deduplicated data blocks 104, i.e. the block references 109 are stored. To further particularly reduce I/O operations, the deduplication index 107 contains container references 105. In fact, in the deduplication index 107 for container references 105 may be stored, and may be paired with a block reference 109 which is a mini block ID compared with the block IDs stored in the conventional deduplication index 107. The block reference 109 is sufficient to avoid collisions but enough to identify, which entries can be removed, when needed.

According to the present disclosure, the total metadata is reduced dramatically by referring to container identifiers 105$i$ (2-bit) and segment identifiers 110 (14-bit) in each deduplicated data block 104, instead of previously 40 bytes. The metadata of each container 101, that is the segment metadata 103 of each data segment 102 in the container 101, supports this by maintaining a segment identifier 110 for each data segment 102. The entries in the deduplication index 107 are denormalized in order to save I/O operations. They now contain the relevant container references 105, and block references 109, in order to keep track of which block the segment reference 108 originates so that it can be removed when that block is deleted. Overall, the present disclosure shrinks the storage needed for all the metadata of all the blocks, opening different storage options.

In particular, according to embodiments of the present disclosure assuming 1 GB of user data, a deduplication ratio of 25:1, a 1.5:1 compression, the space saved for the deduplicated data blocks is 91%. The total space saved is 25%. That means, 34% more data (deduplicated data) can be stored in a repository of the same size.

For a deduplication ratio of 8:1, the space saved for the deduplicated data blocks 104 is 84%, the total of space saved is 9.8%, and 11% more data can be stored in a repository of the same size.

Even for a deduplication ratio of 1:1, the space saved for the deduplicated data blocks 104 is still 44.9%, the total space saved is still 1.23%, and 1% more data can be stored in a repository of the same size.

Furthermore, conventionally 25 I/O operations were needed to process one data block 300. Now 8 I/O operations are saved, leading to a reduction of 32%. In particular, it is not necessary anymore to read the deduplicated data blocks 104, which saves the 8 I/O operations.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An apparatus for storing received data blocks as deduplicated data blocks, the apparatus being configured to:
    maintain a plurality of containers,
        wherein a reference to a container of the containers is unique within the apparatus,
        wherein each of the containers comprises one or more data segments and segment metadata for each data segment of the data segments, the respective segment metadata comprising a segment identifier and a segment reference, and
        wherein the segment identifier is unique within the container and the segment reference is unique within the apparatus;
    maintain a plurality of the deduplicated data blocks storing:
        the received data blocks,
            wherein each deduplicated data block, of the deduplicated data blocks, comprises a plurality of identified container references, a container reference identifier being unique within the deduplicated data block; and
        an ordered list of one or more segment indicators,
            wherein each of the segment indicators comprises the segment identifier and the container reference identifier of the container reference of the container that contains the identified data segment, the order thereof being the same as the data segments of a respective received data block of the received data blocks, and
    maintain a deduplication index comprising a plurality of segment references, comprised of the segment reference for a plurality of the containers, or derivatives of the segment references,
        wherein each of the segment references or each of the derivatives of the segment references is calculated from the respective data segment from the respective received data block and is associated at least with the respective container reference referenced by the deduplicated data block and one unique block reference to the deduplicated data block,
        wherein the apparatus is further configured to, for storing the received data block as the deduplicated data block:
            segment the received data block into the corresponding data segments;
            calculate the respective segment reference for each of the data segments to determine the corresponding segment references;
            choose a subset of the segment references or derivatives of the segment references;
            search in the deduplication index for the segment references or the derivatives of the segment references included in the subset of the segment references and retrieve the container references associated with the segment references or the derivatives of the segment references found in the deduplication index;
            retrieve the segment metadata from the containers referenced by the retrieved container references;
            search for the segment references of the received data block in the retrieved segment metadata;
            choose a plurality of storage containers, the storage containers chosen from the containers and/or new containers, such that each of the data segments of the received data block is already stored in the plurality of storage containers and there is enough free space in the plurality of storage containers to store the data segments of the received data block that are not yet stored in any container of the plurality of storage containers;
            assign to each not yet stored data segment, of the data segments, one storage container of the plurality of storage containers with sufficient space to store the not yet stored data segment, and assign a new segment identifier unique within the storage container to the not yet stored data segment, and create segment metadata for the not yet stored data segment using the new segment identifier and the segment references; and
            store the segment metadata of the net yet stored data segment and the not yet stored data segment in the storage container.

2. The apparatus according to claim 1, further configured to, for storing the received data block as the deduplicated data block:
    construct the plurality of identified container references from the plurality of storage containers, wherein the container reference identifier for each of the identified container references is unique within the deduplicated data block;
    construct the ordered list of the one or more segment indicators using the plurality of identified container references and the segment identifier of each of the data segments of the received data block; and
    store the deduplicated data block containing the plurality of identified container references and the ordered list of one or more segment indicators.

3. The apparatus according to claim 1, wherein each of the deduplicated data blocks further includes a subset of the segment references or derivatives thereof.

4. The apparatus according to claim 3,
    wherein the subset of the segment references or derivatives thereof of each deduplicated data block includes a number N of the segment references or derivatives thereof, which are selected from a number M of the segment references or derivatives thereof calculated from its M data segments, and
    wherein N is smaller than M.

5. The apparatus according to claim 1, configured to, for retrieving the received data block:
    retrieve the stored deduplicated data block of the received data block, retrieve for the container reference identifier and the segment identifier of each of the segment indicators of the ordered list of the one or more segment indicators in the deduplicated data block, the data of the identified data segment from the identified referenced container, and reconstruct the received data block from the retrieved data of the identified data segments of the identified referenced containers, according to the order of the ordered list of the one or more segment indicators in the deduplicated data block.

6. The apparatus according to claim 1, configured to, for deleting a data block:
retrieve the deduplicated data block related to the data block to be deleted;
retrieve, for the corresponding container referenced by each of the container references in the retrieved deduplicated data block, the segment identifiers and the segment references;
search for each of the segment references or the derivatives of the segment references included in the retrieved deduplicated data block in the deduplication index, in order to retrieve the associated at least one container reference and block references; and
delete the retrieved deduplicated date block and delete each of the container references and the block reference that matches the container reference in the data block to be deleted and a block reference of the data block to be deleted, respectively, from the deduplication index.

7. The apparatus according to claim 1, wherein:
the segment metadata of each of the data segments in the plurality of containers further comprises a reference count, and
the apparatus is configured to increase the reference count, upon the apparatus storing a data block containing that data segment, and to decrease the reference count, when it deletes a data block containing that data segment.

8. The apparatus according to claim 1, wherein a segment reference, of the segment references, calculated from the associated data segment is a hash value.

9. The apparatus according to claim 1, wherein the size of a segment indicator, of the segment indicators, in the associated deduplicated data block is 16 bits or less.

10. The apparatus according to claim 1, wherein a segment identifier, of the segment identifiers, is an integer.

11. The apparatus according to claim 1, wherein the size of the unique block reference in the deduplication index is between 1 and 8 bytes.

12. The apparatus according to claim 4, wherein N is 4.

13. The apparatus according to claim 8, wherein the hash value is a strong hash value.

14. The apparatus according to claim 10, wherein the segment identifier is a 14-bit integer.

15. The apparatus according to claim 11, wherein the size of the block reference in the deduplication index is 4 bytes.

16. A method for storing received data blocks as deduplicated data blocks, the method comprising:
maintaining a plurality of containers,
wherein a reference to a container of the containers is unique and each of the containers comprises one or more data segments and segment metadata for each data segment of the data segments, the segment metadata comprising a segment identifier and a segment reference, and
wherein the segment identifier is unique within the container and the segment reference is unique;

maintaining a plurality of the deduplicated data blocks storing:
the received data blocks,
wherein each deduplicated data block, of the deduplicated data block, comprises a plurality of identified container references, and wherein a container reference identifier is unique within the deduplicated data block; and
an ordered list of one or more segment indicators,
wherein each of the segment indicators comprises the segment identifier and the container reference identifier of the container reference of the container that contains the identified data segment, the order thereof being the same as the data segments of a respective received data of the received data blocks; and maintaining a deduplication index comprises a plurality of segment references or derivatives of the segment references,
wherein each of the segment references or the derivatives of the segment references is calculated from the respective data segment from the respective received data block and is associated at least with the respective container reference referenced by the deduplicated data block and one unique block reference to the deduplicated data block, wherein the method further comprises, for storing the received data block as the deduplicated data block:
segmenting the received data block into the corresponding data segments;
calculating the respective segment reference for each of the data segments to determine the corresponding segment references;
choosing a subset of the segment references or derivatives of the segment references;
searching in the deduplication index for the segment references or the derivatives of the segment references included in the subset of the segment references and retrieve the container references associated with the segment references or the derivatives of the segment references found in the deduplication index;
retrieving the segment metadata from the containers referenced by the retrieved container references;
searching for the segment references of the received data block in the retrieved segment metadata;
choosing a plurality of storage containers, the storage containers chosen from the containers and/or new containers, such that each of the data segments of the received data block is already stored in the plurality of storage containers and there is enough free space in the plurality of storage containers to store the data segments of the received data block that are not yet stored in any container of the plurality of storage containers;
assigning to each not yet stored data segment, of the data segments, one storage container of the plurality of storage containers with sufficient space to store the not yet stored data segment, and assign a new segment identifier unique within the storage container to the not yet stored data segment, and create segment metadata for the not yet stored data segment using the new segment identifier and the segment references; and
storing the segment metadata of the net yet stored data segment and the not yet stored data segment in the storage container.

17. A non-transitory computer readable medium comprising a program code for performing, when running on a computer, the method according to claim 16.

* * * * *